(12) United States Patent
Bhandari et al.

(10) Patent No.: US 10,795,711 B2
(45) Date of Patent: Oct. 6, 2020

(54) PREDICTIVE ALLOCATION OF VIRTUAL DESKTOP INFRASTRUCTURE COMPUTING RESOURCES

(71) Applicant: VMWARE, INC., Palo Alto, CA (US)

(72) Inventors: Akshay Bhandari, Bangalore (IN); Aayush Asawa, Bangalore (IN); Gopal Gorthi, Bangalore (IN); Satish Anumalasetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 292 days.

(21) Appl. No.: 15/911,193

(22) Filed: Mar. 5, 2018

(65) Prior Publication Data
US 2019/0213027 A1 Jul. 11, 2019

(30) Foreign Application Priority Data
Jan. 10, 2018 (IN) .............................. 201841001121

(51) Int. Cl.
G06F 9/455 (2018.01)
G06F 9/50 (2006.01)
G06F 9/451 (2018.01)

(52) U.S. Cl.
CPC .......... *G06F 9/45558* (2013.01); *G06F 9/452* (2018.02); *G06F 9/5027* (2013.01); *G06F 9/5077* (2013.01); *G06F 2009/4557* (2013.01); *G06F 2009/45575* (2013.01)

(58) Field of Classification Search
CPC .... G06F 9/45558; G06F 9/452; G06F 9/5027; G06F 9/5077; G06F 9/505; G06F 2009/4557; G06F 2009/45575; G06F 2209/5019
See application file for complete search history.

(56) References Cited

U.S. PATENT DOCUMENTS

| 9,378,044 | B1 * | 6/2016 | Gaurav | G06F 9/5077 |
| 9,600,774 | B1 * | 3/2017 | Biemueller | G06F 9/45533 |
| 9,710,830 | B1 * | 7/2017 | Vermeulen | G06Q 30/02 |
| 9,766,693 | B2 * | 9/2017 | Saxena | G06F 1/3296 |
| 9,928,092 | B1 * | 3/2018 | Pagl | G06F 11/14 |
| 10,228,864 | B1 * | 3/2019 | Zelenov | G06F 12/0862 |
| 10,366,346 | B2 * | 7/2019 | Achin | G06Q 10/04 |

(Continued)

FOREIGN PATENT DOCUMENTS

| CN | 105760213 A | * | 7/2016 | |
| JP | 2013206321 A | * | 10/2013 | |
| WO | WO-2016178376 A1 | * | 11/2016 | ......... H04L 41/0896 |

*Primary Examiner* — Kostas J Katsikis

(74) *Attorney, Agent, or Firm* — Thomas | Horstemeyer, LLP

(57) ABSTRACT

Various examples are disclosed for predictive allocation of computing resources in a virtual desktop infrastructure environment. A computing environment can generate a predictive usage model as a time series that forecasts a usage of virtual machines that provide virtual desktop sessions in a virtual desktop infrastructure environment. The computing environment can determine a number of the plurality of virtual machines that will be operating at a future time utilizing the predictive usage model and identify computing resources required for the number of the virtual machines to operate at the future time. The computing environment can allocate the computing resources such that the computing resources are available at the future time.

20 Claims, 9 Drawing Sheets

(56) References Cited

U.S. PATENT DOCUMENTS

| | | | |
|---|---|---|---|
| 10,387,900 B2* | 8/2019 | Bledsoe | G06Q 10/06395 |
| 10,489,074 B1* | 11/2019 | Gritter | G06F 3/061 |
| 10,509,667 B1* | 12/2019 | Popuri | G06F 9/45558 |
| 2011/0307899 A1* | 12/2011 | Lee | G06F 9/5027 |
| | | | 718/104 |
| 2012/0089726 A1* | 4/2012 | Doddavula | G06F 9/5072 |
| | | | 709/224 |
| 2016/0005055 A1* | 1/2016 | Sarferaz | G06Q 10/04 |
| | | | 705/7.31 |
| 2016/0077859 A1* | 3/2016 | Cropper | G06F 9/4418 |
| | | | 718/1 |
| 2017/0093639 A1* | 3/2017 | Dabbagh | H04L 41/16 |
| 2017/0199564 A1* | 7/2017 | Saxena | G06F 1/3296 |
| 2017/0249564 A1* | 8/2017 | Garvey | G06F 17/18 |
| 2017/0249649 A1* | 8/2017 | Garvey | G06Q 10/06 |
| 2017/0364851 A1* | 12/2017 | Maheshwari | G06Q 10/06314 |
| 2018/0039899 A1* | 2/2018 | Biemueller | G06F 9/45533 |
| 2018/0060744 A1* | 3/2018 | Achin | G06Q 10/04 |
| 2018/0081730 A1* | 3/2018 | Duttagupta | G06F 11/3438 |
| 2018/0107503 A1* | 4/2018 | Machida | G06F 9/5083 |
| 2018/0247215 A1* | 8/2018 | Garvey | G06N 7/005 |
| 2018/0300737 A1* | 10/2018 | Bledsoe | G06Q 30/0202 |
| 2019/0163528 A1* | 5/2019 | Zhou | G06F 9/5072 |
| 2019/0188593 A1* | 6/2019 | Wang | G06Q 30/0248 |
| 2019/0213027 A1* | 7/2019 | Bhandari | G06F 9/452 |
| 2020/0026576 A1* | 1/2020 | Kaplan | G06F 16/2282 |
| 2020/0027014 A1* | 1/2020 | Wen | G06N 7/005 |

* cited by examiner

PREDICTIVE ALLOCATION OF VIRTUAL DESKTOP INFRASTRUCTURE COMPUTING RESOURCES

RELATED APPLICATIONS

Benefit is claimed under 35 U.S.C. 119(a)-(d) to Foreign Application Serial No. 201841001121 filed in India entitled "PREDICTIVE ALLOCATION OF VIRTUAL DESKTOP INFRASTRUCTURE COMPUTING RESOURCES", on Jan. 10, 2018, by VMware, Inc., which is herein incorporated in its entirety by reference for all purposes.

BACKGROUND

Computer virtualization relates to the creation of a virtualized version of a physical device, such as a server, a storage device, a central processing unit (CPU), a graphics processing unit (GPU), or other computing resources. For instance, a virtual machine (VM) is an emulation of a computer system and can be customized to include, for example, a predefined amount of random access memory (RAM), hard drive storage space, as well as other computing resources that emulate a physical machine. As virtual machines resemble physical computer architectures, virtual machines can provide the equivalent functionality of a physical computer. Virtual machines can be executed remotely, in a data center for example, to provide remote desktop computer sessions for employees of an enterprise. Thus, many enterprises have moved away from purely physical desktops and instead utilize virtual machines that provide virtual desktop sessions.

However, many virtualization environments inefficiently utilize power and other computing resources. For example, some virtualization environments dedicate physical hardware for each virtual desktop purchased or leased, where the physical hardware is dedicated to, enabled, and operational twenty-four hours a day, seven days a week. As virtual desktops usually do not require resources for such amount of time, computing resources and power of the data center are inefficiently allocated. For instance, peak usage of VMs may occur during office hours, while few VMs are used during nighttime hours. However, the unused VMs continue to execute throughout the night, consuming computing resources, such as CPU resources, GPU resources, memory, and electrical power.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
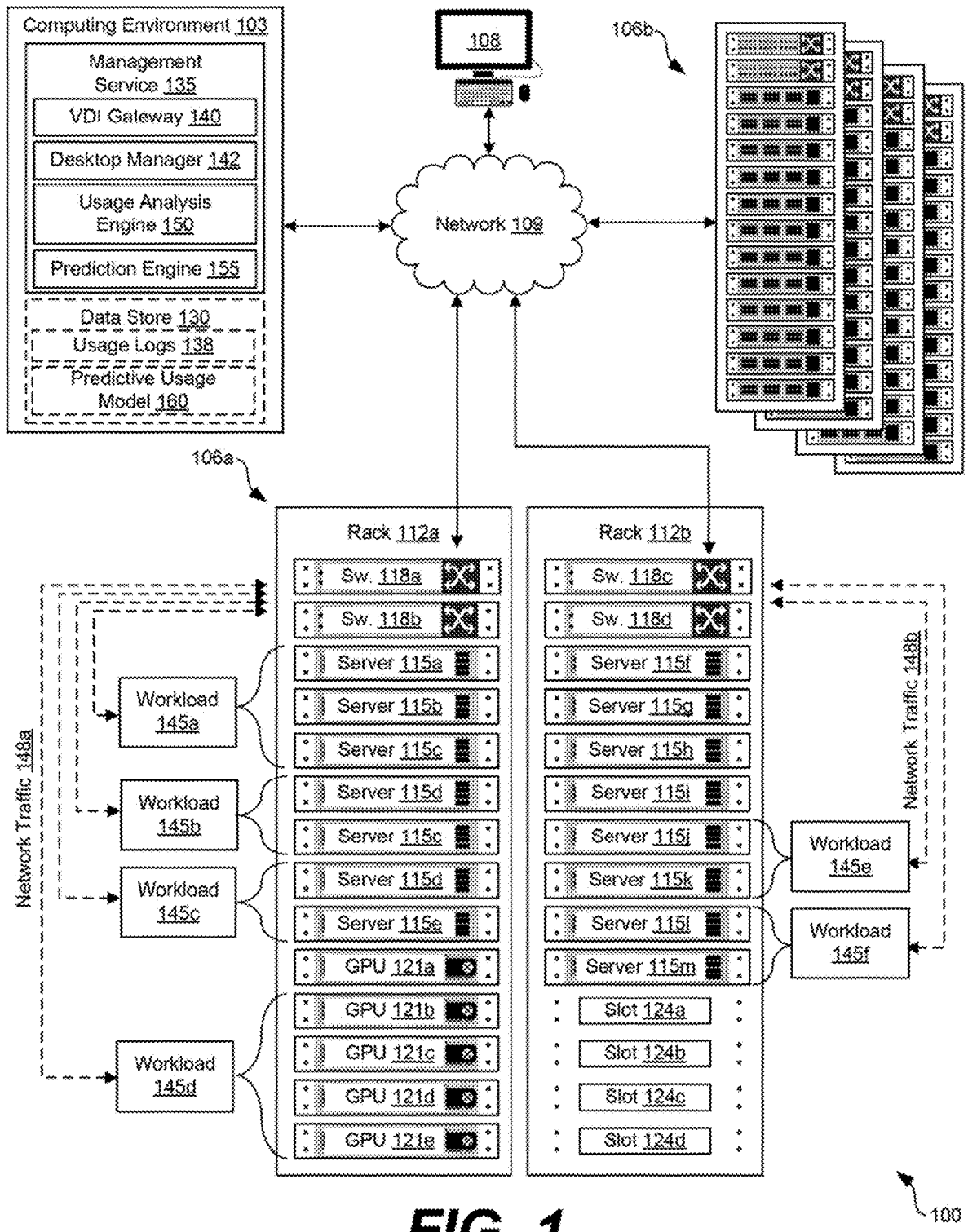
FIG. 1 is a drawing of an example of a virtual desktop infrastructure (VDI) environment for predictive allocation of computing resources for virtual machines.

The present disclosure relates to the predictive allocation of computing resources in virtual desktop infrastructure (VDI) and similar environments. Various organizations are moving away from providing and maintaining purely physical desktops for employees and other individuals and, instead, are moving towards providing virtual desktop environments for employees to utilize. Some virtualization products deliver comprehensive end-user computing (EUC) capabilities. These virtualization products depend on a hypervisor or a virtual machine monitor (VMM) capable of managing computing resources for virtual machines, such as hardware resources. The automated management of physical resources can be critical to reduce the operational costs of virtualization environments.

Some virtualization solutions rely on distributed resource scheduler (DRS) or distributed power management (DPM) services, as well as other similar hypervisor services, to optimize hardware resources and redistribute virtual machines among the physical servers for dynamic workloads while optimizing energy efficiency, reducing cooling costs, and performing other optimization tasks. Some DRS services are able to forecast CPU and memory utilization; however, conventional approaches are limited in virtual desktop infrastructure environments. For instance, DRS and DPM services are not capable of determining whether a virtual machine has been connected to by an end user or whether an end user is actively using the virtual machine. Thus, any forecasted memory and CPU usage applied to these virtual machines (which are not used and powered on) is constant. In other words, DRS services will assume behavior of an unused virtual machine as a constant load on the host and will not perform any action to redistribute these VMs.

In virtual desktop infrastructure environments, end users traditionally access virtual desktops only during certain periods, such as during office hours. The virtual desktops, however, continue to execute in a data center consuming power and other computing resources although unused. Though DPM and DRS services can attempt to redistribute VMs to save computing resources, their capabilities are limited, especially in context of a virtual desktop infrastructure environment. For instance, as virtual desktop infrastructure environments move towards stateless desktops, an end user is not bound to a particular virtual machine or, in other words, an end user can log-on to any virtual machine and all the application and user data will be retained and provided to the user, regardless of which virtual machine accessed. In a virtual desktop infrastructure environment, a virtual machine is only needed when being actively used by an end user. To provide a good user experience, current implementations require all virtual machines in a pool (or group) of virtual machines to be powered on, even when only a single virtual machine is required. If the virtual machines are not powered on, there will be a delay in allocating a desktop by a broker service which will lead to bad user experience According to various examples provided herein, a computing environment can identify usage patterns of virtual machines (VMs), as well as users of those virtual machines, in a virtual desktop infrastructure environment. In some examples, the computing environment can generate a predictive usage model to forecast an estimated number of virtual machines that will actively be used by a group, such as an enterprise or other organization, at a future time. In some examples, the predictive usage model can include a time series, as will be discussed. The computing environment can utilize the predictive usage model to forecast and allocate computing resources, such that a sufficient amount of computing resources will be available, also while freeing up computing resources that will not be used. For instance, a number of virtual machines can be made available that match an anticipated number of user workloads while virtual machines that aren't required will be disabled, as well as their underlying hosts.

Once computing resources of hosts are reduced, the computing environment can redistribute active virtual machines to other hosts in a cluster and take actions to reduce the number of active hosts. In some examples, inactive hosts can be placed temporarily in standby mode, maintenance mode, or powered off, thereby reducing CPU, memory, power, cost, and other resource consumption in the computing environment. In other examples, the inactive hosts can be utilized for other computing tasks.

As can be appreciated, the overall efficiency of the virtualization environment is improved as computing resources are more efficiently allocated while the operational cost for running a data center can be reduced due to the reduction in energy costs. Additionally, my determining geographic locations for end users, virtual machines can be assigned to end users based on geographic location, thereby reducing network latency in virtual desktop sessions. Thus, the present application, and the examples described herein, are directed to improving the performance of a computer network, namely, by improving the efficiency and operation of hosts and related computing resources in a data center that provides, for instance, a virtualization environment that provides virtual desktop sessions for end users.

With reference to FIG. 1, an example of a networked environment 100 is shown. The networked environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. As the networked environment 100 can serve up virtual desktops to end users, the networked environment 100 can also be described as a virtual desktop infrastructure (VDI) environment.

In various embodiments, the computing systems 106 can include a plurality of devices installed in racks 112 which can make up a server bank, computing cluster, or a computer bank in a data center or other like facility. The devices in the computing systems 106 can include any number of physical machines, virtual machines, and software, such as operating systems, drivers, hypervisors, and computer applications. In some examples, a computing environment 103 can include an enterprise computing environment that includes hundreds or even thousands of physical machines, virtual machines, and other software implemented in devices stored in racks 112, distributed geographically and connected to one another through the network 109. It is understood that any virtual machine is implemented using at least one physical device.

The devices in the racks 112 can include, for example, memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage a virtualization infrastructure. The physical hardware for a server 115 can include a CPU, graphics card (having one or more GPUs 121), data bus, memory, and other components. In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, if a server 115 executes a virtual machine, the server 115 can be referred to as a "host," while the virtual machine can be referred to as a "guest." Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include VMware ESX™ hypervisor or a VMware ESXi™ hypervisor. It is understood that the computing systems 106 are scalable, meaning that the computing systems 106 in the networked environment 100 can be scaled dynamically to include additional servers 115, switches 118, GPUs 121, power sources, and other components, without degrading performance of the virtualization environment.

Similarly, the computing environment 103 can include, for example, a server or any other system providing computing capability. Alternatively, the computing environment 103 can include a plurality of computing devices that are arranged, for example, in one or more server banks, computer banks, computing clusters, or other arrangements. The computing environments 103 can include a grid computing resource or any other distributed computing arrangement. The computing devices can be located in a single installation or can be distributed among many different geographical locations. Although shown separately from the computing systems 106, it is understood that in some examples the computing environment 103 the computing systems 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above.

As the computing environment 103 communicates with the computing systems 106 and client devices 108 for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster in the computing systems 106. In some examples, the computing environment 103 can include one or more top-of-rack (TOR) devices.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, such as structure query language (SQL) databases, non-SQL databases, or other relational or non-relational databases. The data stored in the data store 130, for example, can be associated with the operation of the various services or functional entities described below.

In some examples, the data store 130 can include a database or other memory that includes, for example, usage logs 139 having records of user interactions with a virtualized desktop served up by the computing systems 106 and/or the computing environment 103. User interactions can include, for example, log-on requests, log-off requests, particular actions performed in a virtualized desktop session, periods of activity or inactivity, as well as other interactions. Each interactions can be stored in the data store 130 in association with a timestamp describing the time the user interaction was performed.

The components executed on the computing environment 103 can include, for example, a management service 135 as well as other applications, services, processes, systems, engines, or functionality not discussed in detail herein. The management service 135 can be executed to oversee the operation of the networked environment 100 through management of the computing systems 106 as well as the devices and software that make up the computing systems 106. In some examples, an enterprise, organization, or other entity, can operate the management service 135 to oversee or manage the operation of devices in the racks 112, such as servers 115, switches 118, GPUs 121, power supplies, cooling systems, or other components. Through the management service 135, information technology (IT) personnel or other administrators can create virtual desktops in a data center capable of being delivered to and accessed by employees or other individuals as a managed service. Through the virtual desktops, end users can be provided with a familiar, personalized environment that they can access from any number of devices from any location while the administrators gain centralized control, efficiency, and security by having desktop data in the data center.

Further, in some examples, the management service 135 can include a VDI gateway 140 and a desktop manager 142. The VDI gateway 140 can include an application or other service that acts as a broker for client connections by authenticating and directing incoming user requests to an appropriate virtual machine, virtual desktop, or server 115. The desktop manager 142 can include an application or other service that serves any request from a client device 108 for a virtual desktop. The VDI gateway 140 and/or the desktop manager 142 can be configured to store data pertaining to requests from the client devices 108 in the usage log 138. The data stored in the usage log 138 can include, for example, a type of request performed, a timestamp at which the request was received, as well as other information.

The management service 135 can also include a usage analysis engine 150 and a prediction engine 155. The usage analysis engine 150 can process data from the usage log 138 and generate a predictive usage model 160. The predictive usage model 160 may include a data model that forecasts a usage of the virtual machines that provide virtual desktop sessions in the virtual desktop infrastructure environment, as will be described. The predication engine 155 can apply the predictive usage model 160 to forecast an amount of virtual desktops required at a future time, as well as the computing resources required for those virtual desktops to execute.

Further, various physical and virtual components of the computing systems 106 can process workloads 145a . . . 145f. Workloads 145 can refer to the amount of processing that a server 115, switch 118, GPU 121, or other physical or virtual component has been instructed to process or route at a given time. The workloads 145 can be associated with virtual machines or other software executing on the servers 115. For instance, the workloads 145 can include tasks to be processed to provide employees of an enterprise with remote desktop sessions or other virtualized computing sessions. The management service 135 can maintain a listing of active or inactive workloads 145 as well as oversee the assignment of various workloads 145 to various devices in the computing systems 106. For instance, the management service 135 can assign a workload 145 lacking in available resources to a server 115 that has resources sufficient to handle the workload 145. The workloads 145 can be routed to various servers 115 by the switches 118 as network traffic 148a . . . 148b.

Figure 2:
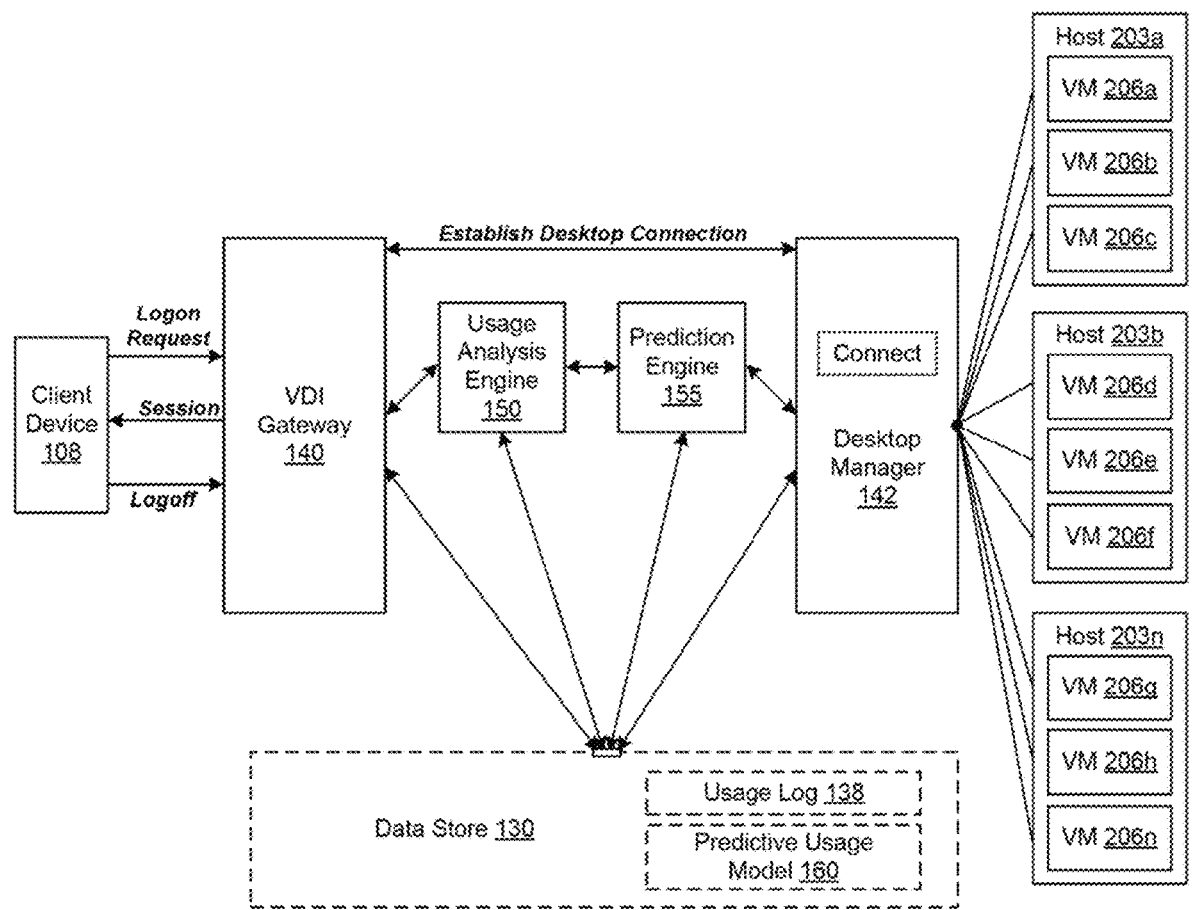
FIG. 2 is a drawing showing an example architecture for predictive allocation of computing resources in a virtual desktop infrastructure environment.

Referring next to FIG. 2, a schematic diagram 200 is provided showing an example of computing architecture for predictive allocation of computing resources in a virtual desktop infrastructure environment. The schematic diagram 200 can include includes hosts 203a . . . 203n (collectively "hosts 203") which can include, for example, servers 115 having one or more virtual machines 206a . . . 206n executable thereon. The virtual machines 206 can be executed to provide a virtual desktop when requested by one of the client devices 108. In one example, a client device 108 can send a log-on request to the VDI gateway 140, which stores information pertaining to the request in the usage log 138. The desktop manager 142 can identify one of the virtual machines 206 to utilize in serving up a virtual desktop for the client device 108. The period of activity on which the virtual desktop is used can be described as a virtual desktop session. After completion of the virtual desktop session, the client device 108 can send a log-off request to the VDI gateway 140 that, again, stores information pertaining to the request in the usage log 138.

The schematic diagram 200 also includes the usage analysis engine 150 and the prediction engine 155. The usage analysis engine 150 can generate a predictive usage model 160 as a time series capable of predicting virtual desktop usage of a client device 108 (or a pool of client devices 108). As noted above, the usage log 138 can include various information about user interactions performed by a client device 108, as well as a time at which the interactions were performed. In some examples, the usage analysis engine 150 can query the usage log 138 to identify user log-on information, user log-off information, session times, or other similar information for a client device 108 to generate a predictive usage model 160 capable of predicting the future usage of desktops, well in advance of the actual usage.

In some examples, the usage analysis engine 150 can generate a predictive usage model 160 for pools or groups of virtual machines 206. The usage analysis engine 150 can identify a pool of virtual machines 206 based at least in part on an enterprise or other entity leasing or administering a group of virtual machines 206, a geographic location of the client devices 108 accessing the virtual machines 206, as well as other information. For instance, the usage analysis engine 150 can identify all virtual machines 206 leased or otherwise operated by an enterprise and can generate a predictive usage model 160 for the enterprise. Similarly, the usage analysis engine 150 can identify a pool of virtual machines 206 assigned to a particular computing cluster (or group of hosts 203) or a particular rack 112.

In another example, the usage analysis engine 150 can identify a pool of virtual machines 206 based on a geographic location of the client devices 108 accessing the virtual machines 206. For instance, all virtual machines 206 accessed by an East Coast office of an enterprise can be pooled and a predictive usage model 160 for the East Coast office can be determined, while another, different predictive usage model 160 for a West Coast office can be determined. For each non-persistent pool of VMs for a particular tenant, the usage analysis engine 150 can generate a predictive usage model 160 using, for example, log-on time information and log-off time information accessed from the usage log 138.

usage behaviors determined for end users. Once data from the usage log 138 is filtered to obtain virtual desktop usage for a pool of virtual machines 206, the usage analysis engine 150 can parse the information to extract data for log-on and log-off requests. The usage analysis engine 150 can use the log-on and log-off requests, for example, to identify a number of concurrent users logged in (or using) a virtual machine 206 at a particular time in the past. The usage analysis engine 150 can then generate a time series describing a number of users actively using virtual desktops provided by the virtual machines 206.

The prediction engine 155 can use the predictive usage model 160 to forecast a number of concurrent user sessions of virtual desktops on client devices 108 of end users. As requests from client devices 108 are stored in the usage log 138, the usage analysis engine 150 can obtain user access patterns to train the prediction model for pattern analysis. To filter the usage log 138, the usage analysis engine 150 can query the data store 130 to obtain row entries for particular organizations, particular virtual machines 206 (or groups of virtual machines 206), particular types of requests (such as log-on or log-off requests), or other information. In other examples, data obtained from a query can be filtered to obtain only information relevant to past usage of a group of virtual machines 206.

Figure 3:
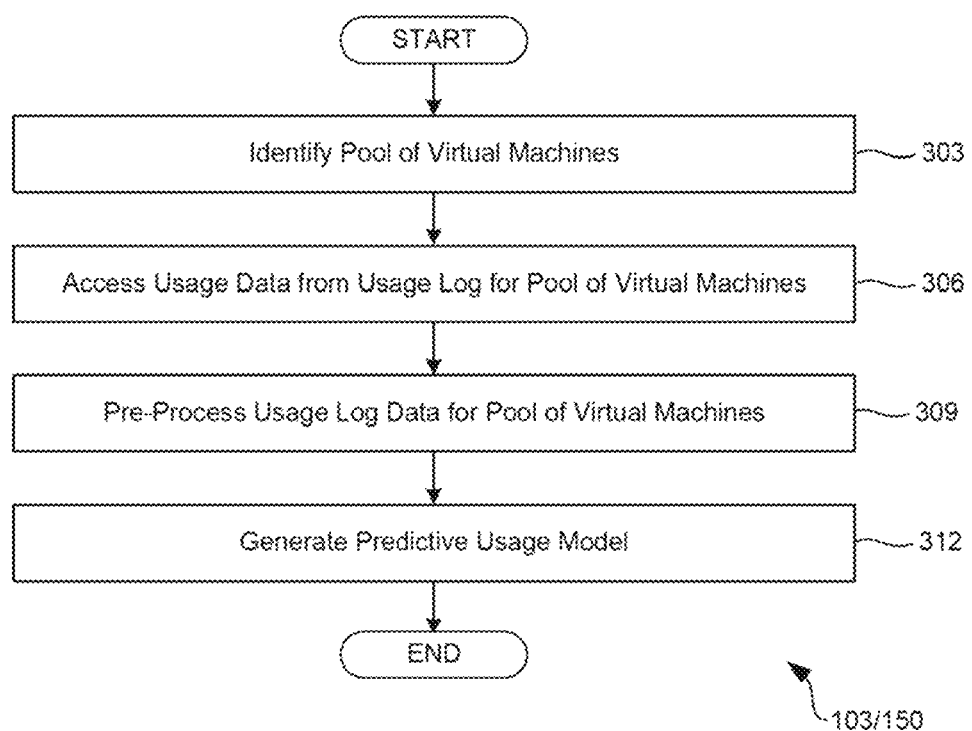
FIG. 3 is a flowchart illustrating functionality implemented by components of the VDE environment of FIG. 1.

Moving on to FIG. 3, shown is a flowchart that provides one example of the operation of a portion of the networked environment 100. The flowchart of FIG. 3 can be viewed as depicting an example of elements of a method implemented

TABLE 1

Example of Portion of Usage Log in the Data Store

| ... | entry_id | org_id | user_id | vm_id | request_type | timestamp | ... |
|---|---|---|---|---|---|---|---|
| ... | ... | ... | ... | ... | ... | ... | ... |
| ... | 452 | alpha_co | smith_john | 74512 | log_on | Dec. 31, 2017 08:25:09 | ... |
|  | 453 | alpha_co | smith_john | 74512 | log_off | Dec. 31, 2017 5:21:04 | ... |
| ... | ... | ... | ... | ... | ... | ... | ... |

The VDI gateway 140 and/or the desktop manager 142 can store instances of user interaction in the usage log 138, for instance, as shown in Table 1. For example, the row having a value of "452" for the "entry_id" indicates that a client device 108 used the "smith_john" user identifier (ID) to log-on to a virtual desktop session at 8:25:09. The row also indicates an identifier for the virtual machine 206 accessed ("74512") as well as an organization the user is associated with ("alpha_co"). The usage analysis engine 150 can extract information from the usage log 138 for one or more organizations and pre-process the usage log 138 to construct a training data set used that can be used by the usage analysis engine 150 to build a predictive usage model 160. In some examples, the usage analysis engine 150 can pre-process the usage log 138 by filtering extraneous (or non-useful) data from the usage log 138 as well as identifying relevant variables in the filtered usage log 138, as will be described. Ultimately, the usage analysis engine 150 constructs a training data set which can be used to generate a time series or similar data model.

Using the filtered data from the usage log 138, the usage analysis engine 150 can identify one or more variables that are able to characterize normal usage behavior. In one example, such a variable can include a number of concurrent users. In additional examples, the variables can pertain to by the management service 135 or the usage analysis engine 150 executing in the computing environment 103 according to one or more examples. The separation or segmentation of functionality as discussed herein is presented for illustrative purposes only.

Beginning with step 303, the usage analysis engine 150 can identify a pool of virtual machines 206 for which a predictive usage model 160 should be generated. It can be beneficial to optimize computing resources for a particular entity, such as an enterprise. Also, it can be beneficial to optimize computing resources in a particular data center, computing system 106, computing cluster, or rack 112. Thus, the usage analysis engine 150 can identify a pool of the virtual machines 206 assigned to the particular data center, computing system 106, computing cluster, rack 112, or having another characteristic. In additional examples, the usage analysis engine 150 can identify a pool of virtual machines 206 based at least in part on an enterprise or other entity leasing or administering a group of virtual machines 206, a geographic location of the client devices 108 accessing the virtual machines 206, as well as other information.

Additionally, in various examples, a context of end user behavior may be determined to introduce and improve prediction models. For instance, the usage analysis engine 150 can identify where end users are located that access virtual machines 206 and the predictive model can be generated based on a geographic location determined for the end users. To this end, a virtual desktop provided by a virtual machine 206 can be allocated to end users based on their geographic location, such that network latency is reduced as opposed to serving up virtual desktops located in distant data centers. In other words, by decreasing network latency, the overall operation of the virtual machine 206 is improved and a faster virtual desktop session can be provided.

In the context of an entity, the usage analysis engine 150 can identify all virtual machines 206 leased or otherwise operated by an enterprise and can generate a predictive usage model 160 for the enterprise. In another example, the usage analysis engine 150 can identify a pool of virtual machines 206 based on a geographic location of the client devices 108 accessing the virtual machines 206. For instance, all virtual machines 206 accessed by an office of an enterprise in China can be pooled and a predictive usage model 160 for the office in China can be determined, while another, different predictive usage model 160 for a United States (or other location) can be determined.

In step 306, the usage analysis engine 150 can access usage data from the usage log 138 corresponding to the pool of virtual machines 206. For instance, if the usage analysis engine 150 is to generate a predictive usage model 160 for an entity to optimize computing resources for that entity, the usage analysis engine 150 can query the usage log 138 using a unique identifier corresponding to the entity. In other words, for an entity "Alpha Co," having a unique identifier of "alpha_co," the usage log 138 can be queried to identify all log-on and log-off requests performed by employees of "Alpha Co."

In step 309, the usage analysis engine 150 can pre-process the data from the usage log 138 accessed in 306, for instance, to construct a training data set used that can be used by the usage analysis engine 150 to build a predictive usage model 160. In some examples, the usage analysis engine 150 can pre-process the usage log 138 by filtering extraneous (or non-useful) data from the usage log 138. For instance, the usage analysis engine 150 can parse the information to extract data for log-on and log-off requests. The usage analysis engine 150 can use the log-on and log-off requests, for example, to identify a number of concurrent users logged in (or using) a virtual machine 206 at a particular time in the past.

Next, in step 312, the usage analysis engine 150 can generate the predictive usage model 160 for the pool of virtual machines 206. In some examples, the predictive usage model 160 includes a time series, where a time series is an ordered sequence of values at regularly spaced intervals. The values in the time series can include, for example, a number of concurrent virtual desktop users at a given time. As can be appreciated, time series can be beneficial in forecasting virtual desktop usage and recognizing patterns in past virtual desktop usage.

Inherent in the collection of virtual desktop usage data recorded over time is some form of randomness, which can include periods of atypical virtual desktop usage. For instance, no virtual desktop usage may occur on a holiday, thus, any usage recorded from the holiday should be discounted in forecasting future usage. In some examples, the usage analysis engine 150 can reduce or cancel random variations. As it can be beneficial to generate a time series having trends and seasonality (identifiable patterns influenced by seasonal patterns), the usage analysis engine 150 can apply "smoothing." By applying a smoothing algorithm, the usage analysis engine 150 can identify underlying trends in virtual desktop usage while reducing the effect of random variation.

Hence, in some examples, the usage analysis engine 150 can build the predictive usage model 160 using a smoothing algorithm, where the smoothing algorithm can include at least one of a simple moving average (SMA) algorithm, an exponential smoothing algorithm, a double exponential smoothing (DES) algorithm, and a triple exponential smoothing (TES) algorithm. For instance, the usage analysis engine 150 can utilize the TES algorithm by assigning exponentially decreasing weights to observations as the observations get older. In other words, recent observations are given relatively more weight in forecasting than the older observations, where observations can include, for example, a number of concurrent users at a given time in the past. Thus, instead of using merely the number of concurrent users at past times (which can be subject to random variations), the usage analysis engine 150 can smooth the metrics to identify the underlying trends of virtual desktop usage.

In one example, the usage analysis engine 150 can apply the TES algorithm using the following equation to determine smoothed values for observations:

$$S_t = \alpha y_{t-1} + (1-\alpha) S_{t-1} \quad 0 < \alpha \leq 1 / t \geq 3 \qquad (\text{eq. 1}),$$

where $S_i$ is a smoothed observation, y is an original observation, and a is a smoothing constant. The subscripts refer to a time (t), such as 1, 2 . . . , n. In some examples, y can include a number of concurrent users at a given time (t), although, in other examples, additional observations can be used. Using eq. 1, the third observation ($S_3$), for example, can be calculated as follows:

$$S_3 = \alpha y_2 + (1-\alpha) S_2 \qquad (\text{eq. 2}),$$

and so forth. Notably, no value is determined for the initial observation, $S_1$. Instead, a smoothed series starts by assigning $S_2$ to $y_1$ ($S_2 = y_1$). After the usage analysis engine 150 has generated a predictive usage model 160, the process can proceed to completion.

Figure 4:
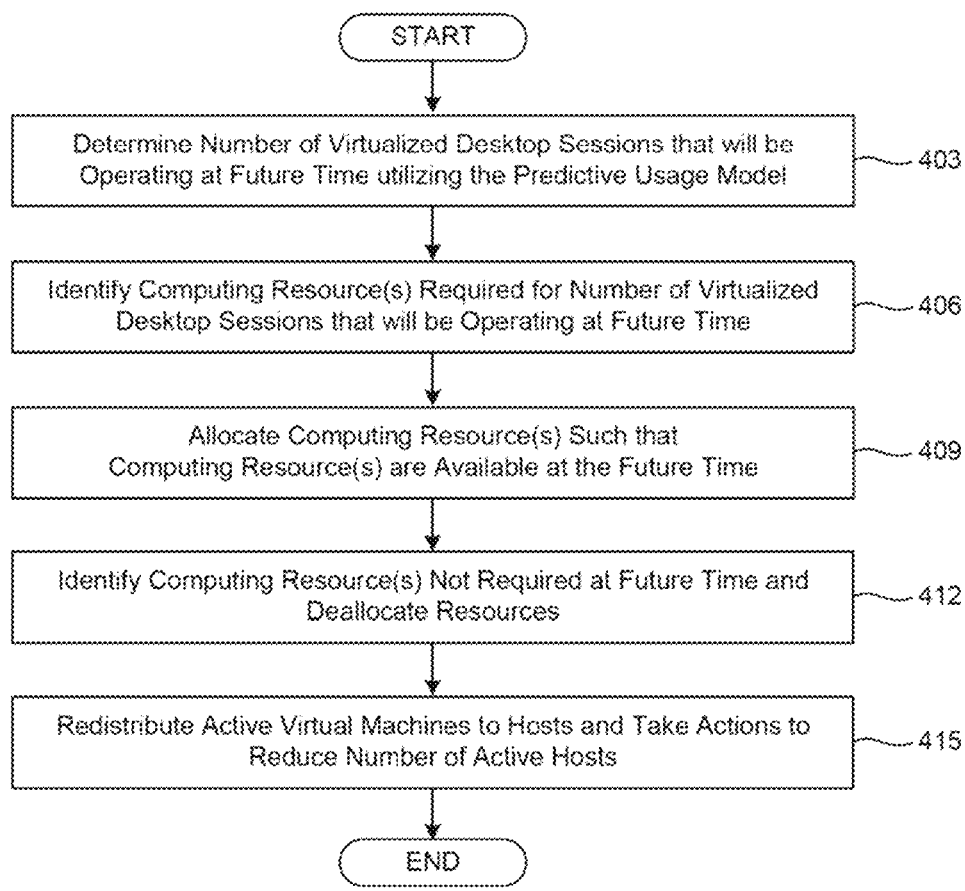
FIG. 4 is a flowchart illustrating functionality implemented by components of the VDE environment of FIG. 1.

Turning now to FIG. 4, shown is a flowchart that provides one example of the operation of a portion of the networked environment 100. The flowchart of FIG. 4 can be viewed as depicting an example of elements of a method implemented by the management service 135 or the prediction engine 155 executing in the computing environment 103 according to one or more examples. The separation or segmentation of functionality as discussed herein is presented for illustrative purposes only.

The prediction engine 155 can use the predictive usage model 160 to forecast usage of virtual desktops on client devices 108 by end users. For instance, the prediction engine 155 can use the predictive usage model 160 to identify a number of concurrent user sessions at a particular time in the future, which can be deterministic of the workload 145 applied to the computing systems 106. Thus, beginning with step 403, the prediction engine 155 can determine a number of virtual desktop sessions that will be operating at a future time utilizing the predictive usage model 160.

In step 406, the prediction engine 155 can identify one or more computing resources required for the number of virtual desktop sessions that will be operating at the future time. For instance, if it is determined that 450 virtual desktop sessions are required at a future time, the prediction engine 155 can determine that 450 virtual machines 206 should be made available, as well as any computing resources required by the virtual machines 206, such as CPU, GPU, and memory access.

In step 409, the prediction engine 155 can allocate computing resources such that the computing resources are available at the future time. For instance, the predication engine 155 can instruct the management service 135 to power up enough servers 115 or other computing resources needed to provide the computing resources identified in step 406. In some examples, the management service 135 can provide a threshold amount of computing resources above the computing resources identified in 406. For instance, assuming the prediction engine 155 estimates that 100 virtual desktop sessions will be required at a future time, and assuming an operational threshold of 20%, the management service 135 can power up 120 virtual machines 206 as well as any computing resources required by the 120 virtual machines 206. Thus, the management service 135 can power up and allocate a number of operational virtual machines 206 equal to or greater than the number of virtual machines 206 forecasted to operate at the future time.

Powering up and allocating virtual machines 206 can include, for example, generating a virtual machine configuration file and executing a virtual machine 206 that utilizes configurations specified in the configuration file. Moreover, a newly provisioned virtual machine 206 can be assigned to a host 203 having a maximum load or, in other words, a maximum number of active virtual machines 206. Thus, active virtual machines 206 are consolidated in hosts 203.

For a given data center, unused or inactive hosts 203 can be powered off. In the case of a host 203 having a small number of virtual machines 206, the virtual machines 206 can be moved to more active hosts 203, or hosts 203 having a greater number of active virtual machines 206, thereby aggregating active virtual machines 206 on active hosts 203. Once resources, such as resources for a host 203, are free or made available on an active host 203, the resources can be used to provision more virtual machines 206 on the same host 203, such that a host consolidation ratio is increased. In turn, by increasing the ability to power off inactive hosts 203, an overall efficiency and performance of a data center is improved and costs associated with maintaining active hosts 203 is reduced.

Next, in step 412, the prediction engine 155 can identify computing resources not required at the future time and, in some examples, the prediction engine 155 can instruct the management service 135 to deallocate the computing resources. Deallocating the computing resources can include, for example, placing inactive hosts 203—hosts 203 not required to power the forecasted number of virtual machines 206—in a standby mode or a maintenance mode. Additionally, deallocating computing resources can include powering off inactive hosts 203.

In another example, if an enterprise has leased 500 virtual machines 206 and the prediction engine 155 forecasts the usage for an upcoming day as 300 virtual machines 206, assuming an operational threshold of 20% (60 virtual desktops), 140 of the virtual machines 206 can be powered off and 360 virtual machines 206 can be left or made active. Additionally, in some situations, a number of virtual desktop users may have logged in above a forecasted estimate. In such a scenario, the management service 135 can keep a buffer of 60 virtual desktops constant. For instance, referring to the example above, if there are 10 virtual desktop log-in requests above 300, the management service 135 can make 10 additional virtual machines 206 active and 130 of the virtual machines 206 can remain powered off.

Once computing resources of a host 203 are reduced, in step 415, the prediction engine 155 can instruct the management service 135 to redistribute active virtual machines 206 to other hosts 203 in a cluster, as well as take other actions to reduce the number of active hosts 203. For instance, the management service 135 can redistribute (or move) active virtual machines 206 from a first host 203 to a second host 203, determine that no virtual machines 206 are active on the first host 203, and, in response to no virtual machines 206 being active on the first host 203, disable the first host 203. Thus, inactive hosts 203 can be placed temporarily in standby mode, maintenance mode, or powered off, thereby reducing CPU, GPU, memory, power, and other resource consumption in the computing environment 103. In other examples, the inactive hosts can be utilized for other computing tasks. As can be appreciated, the overall efficiency of the virtualization environment is improved as computing resources are more efficiently allocated. Additionally, the operational cost for running a data center can be reduced due to the reduction in energy costs. Thus, the present application is directed to improving the efficiency and operation of hosts and related computing resources in a data center than provides, namely, a virtualization environment that utilizes a computing network.

Figure 5:
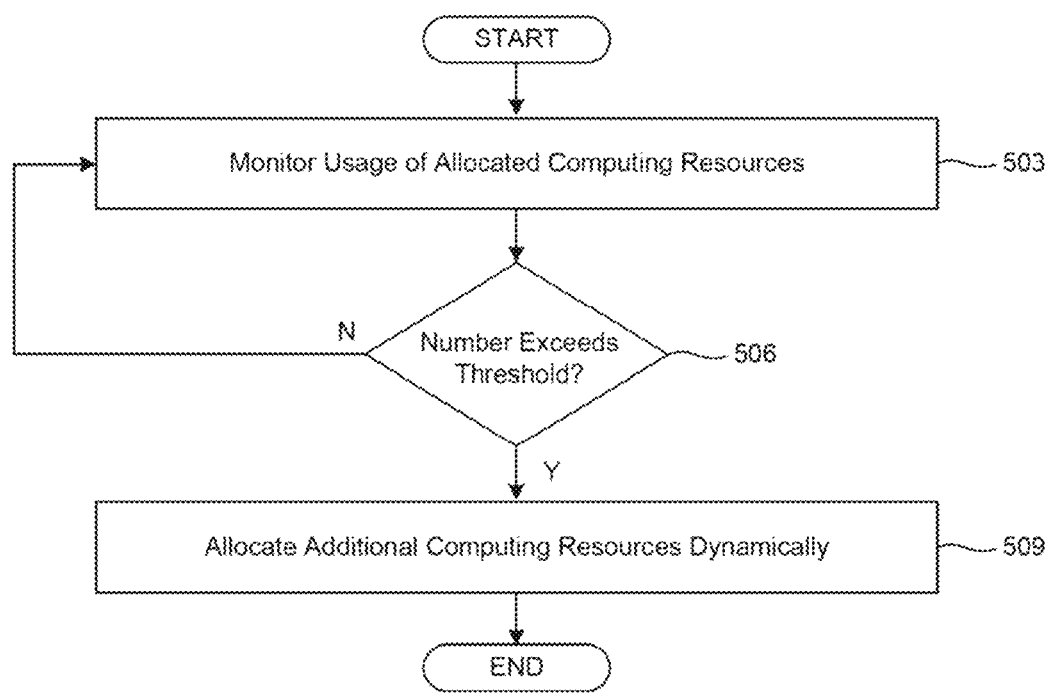
FIG. 5 is a flowchart illustrating functionality implemented by components of the VDE environment of FIG. 1.
Figure 6:
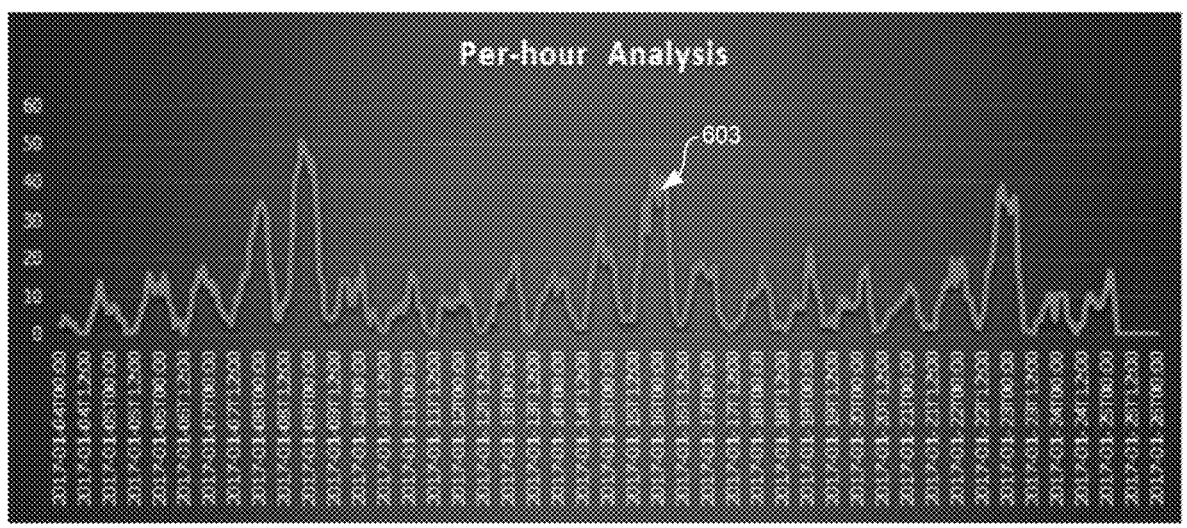
FIG. 6 is a chart showing hourly desktop usage for a pool of virtual machines (VMs) for an example entity operating 620 virtual desktops.
Figure 7:
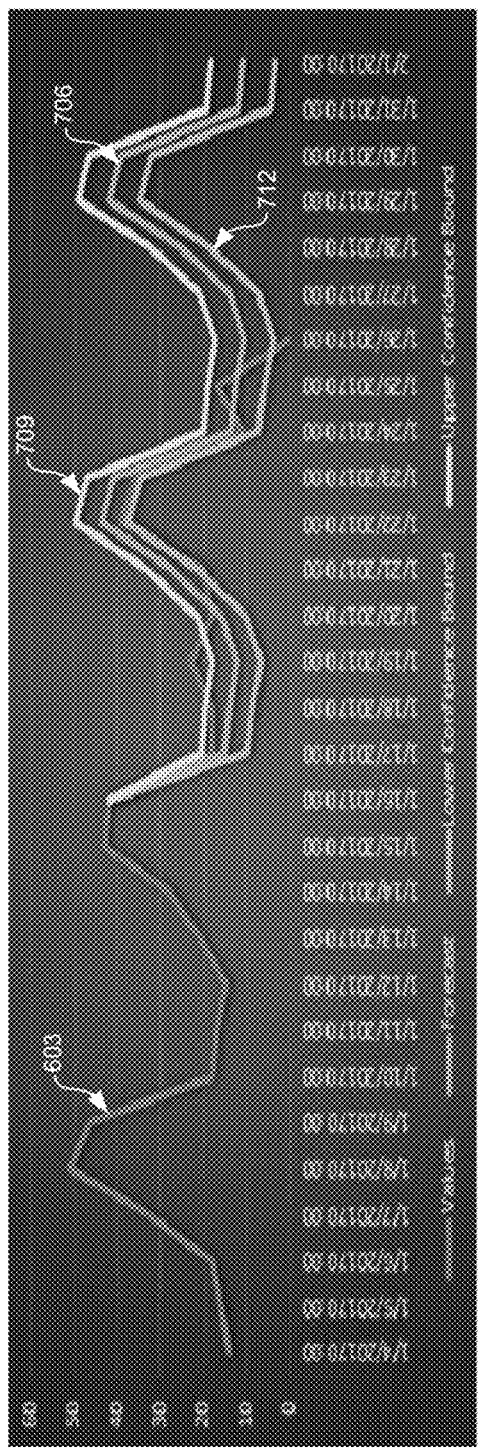
FIG. 7 is a chart showing a daily desktop usage and a forecasted desktop usage for the pool of VMs.

Referring next to FIG. 5, shown is a flowchart that provides one example of the operation of a portion of the networked environment 100. The flowchart of FIG. 5 can be viewed as depicting an example of elements of a method implemented by the management service 135 executing in the computing environment 103 according to one or more examples. The separation or segmentation of functionality as discussed herein is presented for illustrative purposes only.

Begging with step 503, the management service 135 can monitor the usage of the allocated computing resources. For instance, if the prediction engine 155 determines that 100 virtual machines 206 are required at a future time, the management service 135 can queue up the 100 virtual machines 206 and monitor the usage and assignment of the virtual machines 206 as client devices 108 log-on and log-off to virtual desktops provided by the virtual machines 206. In other words, a number of virtual machines 206 actively used by client devices 108 can be monitored.

Next, in step 506, the management service 135 can determine whether the number of the virtual machines 206 (or other computing resources) actively used exceeds an operational threshold. For instance, assuming an operational threshold is 10% and 100 virtual machines 206 are forecasted to be used, the management service 135 can identify when 91 virtual machines 206 have been assigned to client devices 108. If the number of the virtual machines 206 actively used does not exceed the operational threshold, the process can revert to step 503 to continue monitoring the usage of the computing resources. Alternatively, if the number of the virtual machines 206 (or other computing resources) exceeds the operational threshold, the process can proceed to step 509.

In step 509, the management service 135 can allocate additional computing resources dynamically. In other words, if a number of users actively using virtual desktops exceeds the operational threshold, the management service 135 can power on additional virtual machines 206 to comply with the operational threshold. Thus, additional computing resources are not allocated unless required by the demand for the virtual machines 206. Thereafter, the process can proceed to completion.

Moving on to FIGS. 6-12, experimental data is charted to analyze the behavior of two entities having leases for virtual machines 206 while showing the improvements in the forecasting of virtual desktop and other computing resource usage. Starting with FIGS. 6 and 7, the chart 600 and the chart 700 show a past virtual desktop usage for a first entity who leased 620 virtual desktops or, in other words, 620 virtual machines 206. The lines 603 shows the actual concurrent usage of the virtual desktops. The line 706 shown in the chart 700 shows a forecasted value of concurrent virtual desktop usage with an upper confidence bound of 5%, shown by line 709, and a lower confidence bound of 5%, shown by line 712. As can be seen from the chart 600 of FIG. 6 and the chart 700 of FIG. 7, it is evident that, even though the first entity has leased 620 virtual desktops, the client devices 108 of the first entity are concurrently using only a maximum of 55 virtual desktops.

Figure 8:
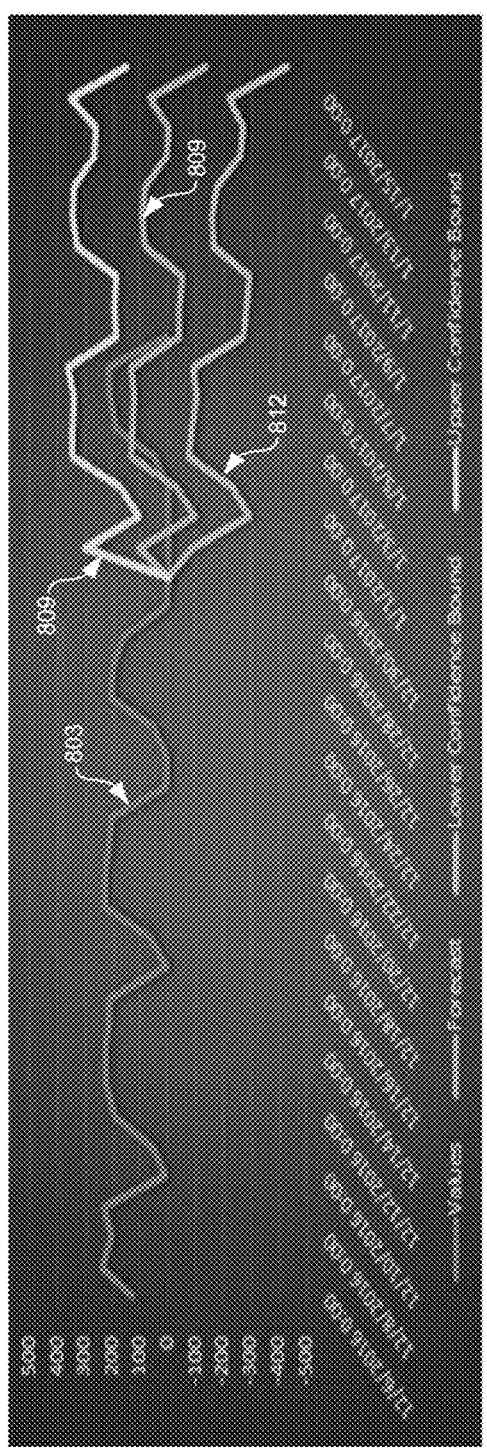
FIG. 8 is a chart showing a daily desktop usage and a forecasted desktop usage for another example entity operating 510 virtual desktops.

Similar observations are evident for a second entity, as shown in FIG. 8. In FIG. 8, the chart 800 shows a past virtual desktop usage for a second entity who leased 510 virtual desktops or, in other words, 510 virtual machines 206. The line 803 shows the actual concurrent usage of the virtual desktops. The line 806 shows a forecasted value of concurrent virtual desktop usage with an upper confidence bound of 5%, shown by line 809, and a lower confidence bound of 5%, shown by line 812.

Figure 9:
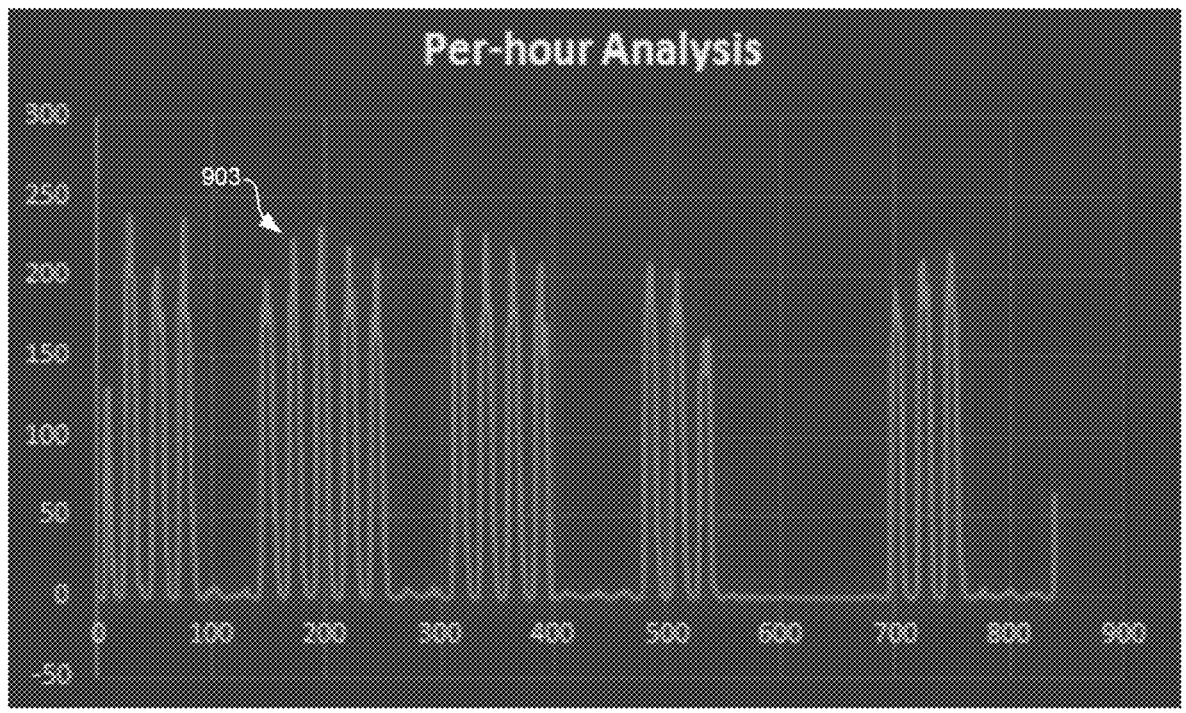
FIGS. 9 and 10 are charts showing an hourly usage for the entity operating 620 virtual desktops.
Figure 10:
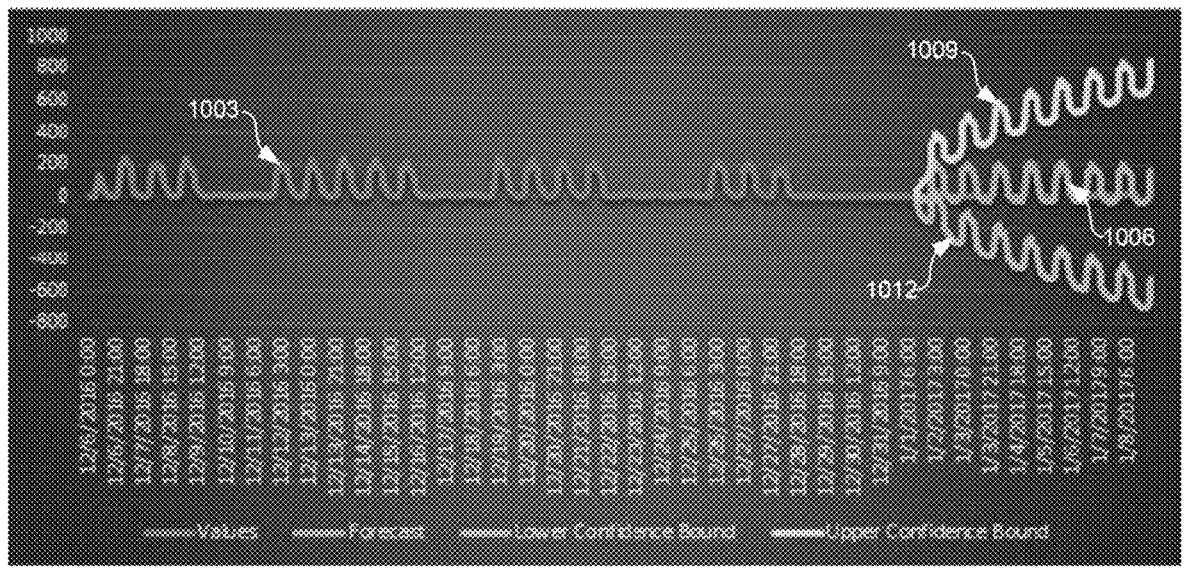

Referring next to FIGS. 9 and 10, the prediction engine 155 can also forecast daily usage as daily usage also has strong trends and seasonality, shown clearly in the chart 900 of FIG. 9 and the chart 1000 of FIG. 10. Specifically, FIG. 9 includes a chart 900 showing an hourly usage of the first tenant, shown by line 903, where high virtual desktop usage is shown as occurring at certain periods of the day and low virtual desktop usage is shown as occurring at other periods of the day. FIG. 10 includes a chart 1000 having a past hourly virtual desktop usage shown by line 1003. The line 1006 shows a forecasted value of concurrent virtual desktop usage with an upper confidence bound of 5%, shown by line 1009, and a lower confidence bound of 5%, shown by line 1012.

Figure 11:
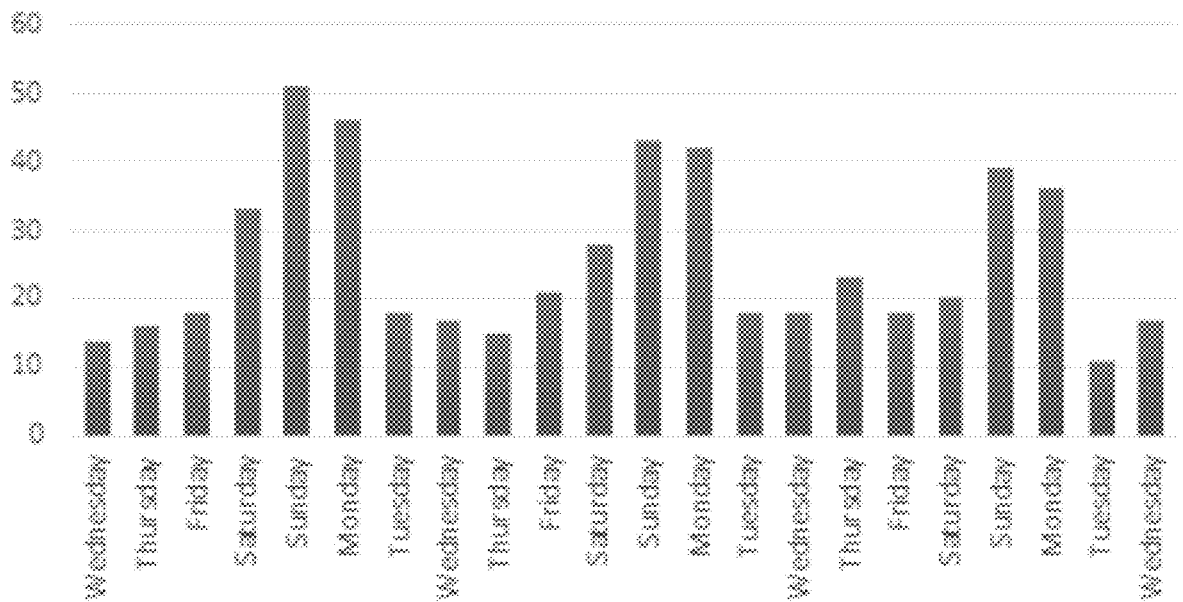
FIG. 11 is a chart showing a per day analysis for the entity operating 620 virtual desktops.
Figure 12:
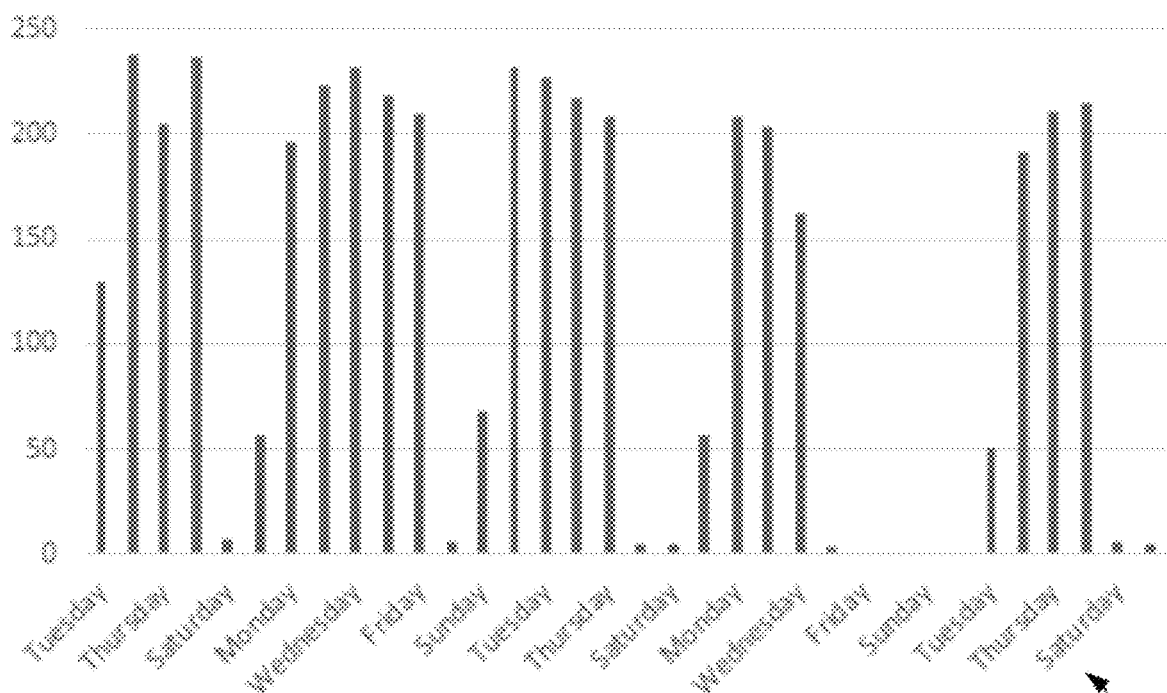
FIG. 12 is a chart showing a per day analysis for the entity operating 510 virtual desktops.

Turning now to FIGS. 11 and 12, a chart 1100 is shown in FIG. 11 that shows a daily virtual desktop usage for the first entity while a chart 1200 is shown in FIG. 12 that shows a daily virtual desktop usage for the second entity. For a particular pool of virtual machines 206, a predictive usage model 160 can be generated based on past daily usage. For example, the usage analysis engine 150 can generate a predictive usage model 160 to forecast usage for an entity on an upcoming Monday using past virtual desktop usage occurring on past Mondays. According to various examples, the usage analysis engine 150 can generate a predictive usage model 160 for any period of time desired, assuming enough information can be gleaned from the usage log 138. As is evident from FIGS. 11 and 12, virtual desktop usage of the entities follow pattern of usage based on the day of the week. The chart 1100 of FIG. 11 indicates, for example, the first entity has maximum usage on Sunday and Monday. Thus, the management service 135 can allocate more resources on Sunday and Monday while conserving resources on other days of the week. The chart 1200 of FIG. 12, on the other hand, indicates that the second entity has minimal desktop usage on Friday to Sunday. Thus, the management service 135 can conserve resources on Friday to Sunday.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for predictive allocation of computing resources in a virtual desktop infrastructure environment, comprising:
    at least one computing device;
    program instructions stored in memory and executable in the at least one computing device that, when executed by the at least one computing device, cause the at least one computing device to:
       generate a predictive usage model that forecasts a usage of a plurality of virtual machines that provide virtual desktop sessions in the virtual desktop infrastructure environment, wherein the predictive usage model is generated by applying a smoothing algorithm to a time series of a number of concurrent virtual desktop users over time, the number of the concurrent virtual desktop users being identified based at least in part on a log-on request or a log-off request generated by a plurality of client devices and accessed from a virtual machine usage log stored in the memory;
       determine a number of the plurality of virtual machines that will be operating at a future time using the predictive usage model;
       identify at least one computing resource required for at least the number of the plurality of virtual machines to operate at the future time; and
       allocate the at least one computing resource such that the at least one computing resource is available at the future time.

2. The system of claim 1, further comprising program instructions that, when executed by the at least one computing device, cause the at least one computing device to:
    redistribute at least one of the plurality of virtual machines from a first host to a second host;
    determine that none of the plurality of virtual machines are active on the first host; and
    in response to none of the plurality of virtual machines being active on the first host, disable the first host.

3. The system of claim 2, wherein the first host is disabled by performing at least one of: causing the first host to enter into a standby mode, causing the first host to enter into a maintenance mode, or powering off the first host.

4. The system of claim 1, wherein the at least one computing resource allocated comprises at least one of: a central processing unit (CPU) resource, a graphics processing unit (GPU) resource, and an amount of memory.

5. The system of claim 1, wherein the predictive usage model is generated by assigning exponentially decreasing weights to usage observations as the usage observations get older, where recent ones of the usage observations are assigned a higher weight relative to older ones of the usage observations.

6. The system of claim 1, wherein the time series comprises a sequence of concurrent virtual desktop usage at regularly-spaced intervals.

7. The system of claim 6, wherein the smoothing algorithm comprises at least one of: a simple moving average (SMA) algorithm, an exponential smoothing algorithm, a double exponential smoothing (DES) algorithm, and a triple exponential smoothing (TES) algorithm.

8. A non-transitory computer-readable medium for predictive allocation of computing resources in a virtual desktop infrastructure environment, comprising embodying program code executable in at least one computing device that, when executed by the at least one computing device, causes the at least one computing device to:
    generate a predictive usage model that forecasts a usage of a plurality of virtual machines that provide virtual desktop sessions in the virtual desktop infrastructure environment, wherein the predictive usage model is generated by applying a smoothing algorithm to a time series of a number of concurrent virtual desktop users over time, the number of the concurrent virtual desktop users being identified based at least in part on a log-on request or a log-off request generated by a plurality of client devices and accessed from a virtual machine usage log stored in memory;
    determine a number of the plurality of virtual machines that will be operating at a future time using the predictive usage model;
    identify at least one computing resource required for at least the number of the plurality of virtual machines to operate at the future time; and allocate the at least one computing resource such that the at least one computing resource is available at the future time.

9. The non-transitory computer-readable medium of claim 8, further comprising program code that, when executed by the at least one computing device, causes the at least one computing device to:
redistribute at least one of the plurality of virtual machines from a first host to a second host;
determine that none of the plurality of virtual machines are active on the first host; and
in response to none of the plurality of virtual machines being active on the first host, disable the first host.

10. The non-transitory computer-readable medium of claim 9, wherein the first host is disabled by performing at least one of: causing the first host to enter into a standby mode, causing the first host to enter into a maintenance mode, or powering off the first host.

11. The non-transitory computer-readable medium of claim 8, wherein the at least one computing resource allocated comprises at least one of: a central processing unit (CPU) resource, a graphics processing unit (GPU) resource, and an amount of memory.

12. The non-transitory computer-readable medium of claim 8, wherein the predictive usage model is generated by assigning exponentially decreasing weights to usage observations as the usage observations get older, where recent ones of the usage observations are assigned a higher weight relative to older ones of the usage observations.

13. The non-transitory computer-readable medium of claim 8, wherein the time series comprises a sequence of concurrent virtual desktop usage at regularly-spaced intervals.

14. The non-transitory computer-readable medium of claim 13, wherein the smoothing algorithm comprises at least one of: a simple moving average (SMA) algorithm, an exponential smoothing algorithm, a double exponential smoothing (DES) algorithm, and a triple exponential smoothing (TES) algorithm.

15. A computer-implemented method for predictive allocation of computing resources in a virtual desktop infrastructure environment, comprising:
generating a predictive usage model that forecasts a usage of a plurality of virtual machines that provide virtual desktop sessions in the virtual desktop infrastructure environment, wherein the predictive usage model is generated by applying a smoothing algorithm to a time series of a number of concurrent virtual desktop users over time, the number of the concurrent virtual desktop users being identified based at least in part on a log-on request or a log-off request generated by a plurality of client devices and accessed from a virtual machine usage log stored in memory;
determining a number of the plurality of virtual machines that will be operating at a future time using the predictive usage model;
identifying at least one computing resource required for at least the number of the plurality of virtual machines to operate at the future time; and
allocating the at least one computing resource such that the at least one computing resource is available at the future time.

16. The computer-implemented method of claim 15, further comprising:
redistributing at least one of the plurality of virtual machines from a first host to a second host;
determining that none of the plurality of virtual machines are active on the first host; and
in response to none of the plurality of virtual machines being active on the first host, disabling the first host.

17. The computer-implemented method of claim 16, wherein the first host is disabled by performing at least one of: causing the first host to enter into a standby mode, causing the first host to enter into a maintenance mode, or powering off the first host.

18. The computer-implemented method of claim 15, wherein the at least one computing resource allocated comprises at least one of: a central processing unit (CPU) resource, a graphics processing unit (GPU) resource, and an amount of memory.

19. The computer-implemented method of claim 15, wherein generating the predictive usage model further comprises assigning exponentially decreasing weights to usage observations as the usage observations get older, where recent ones of the usage observations are assigned a higher weight relative to older ones of the usage observations.

20. The computer-implemented method of claim 15, wherein the time series comprises a sequence of concurrent virtual desktop usage at regularly-spaced intervals.

* * * * *